July 17, 1962 A. R. SMITH 3,044,281
STEERING COLUMN COUPLING
Filed March 10, 1960
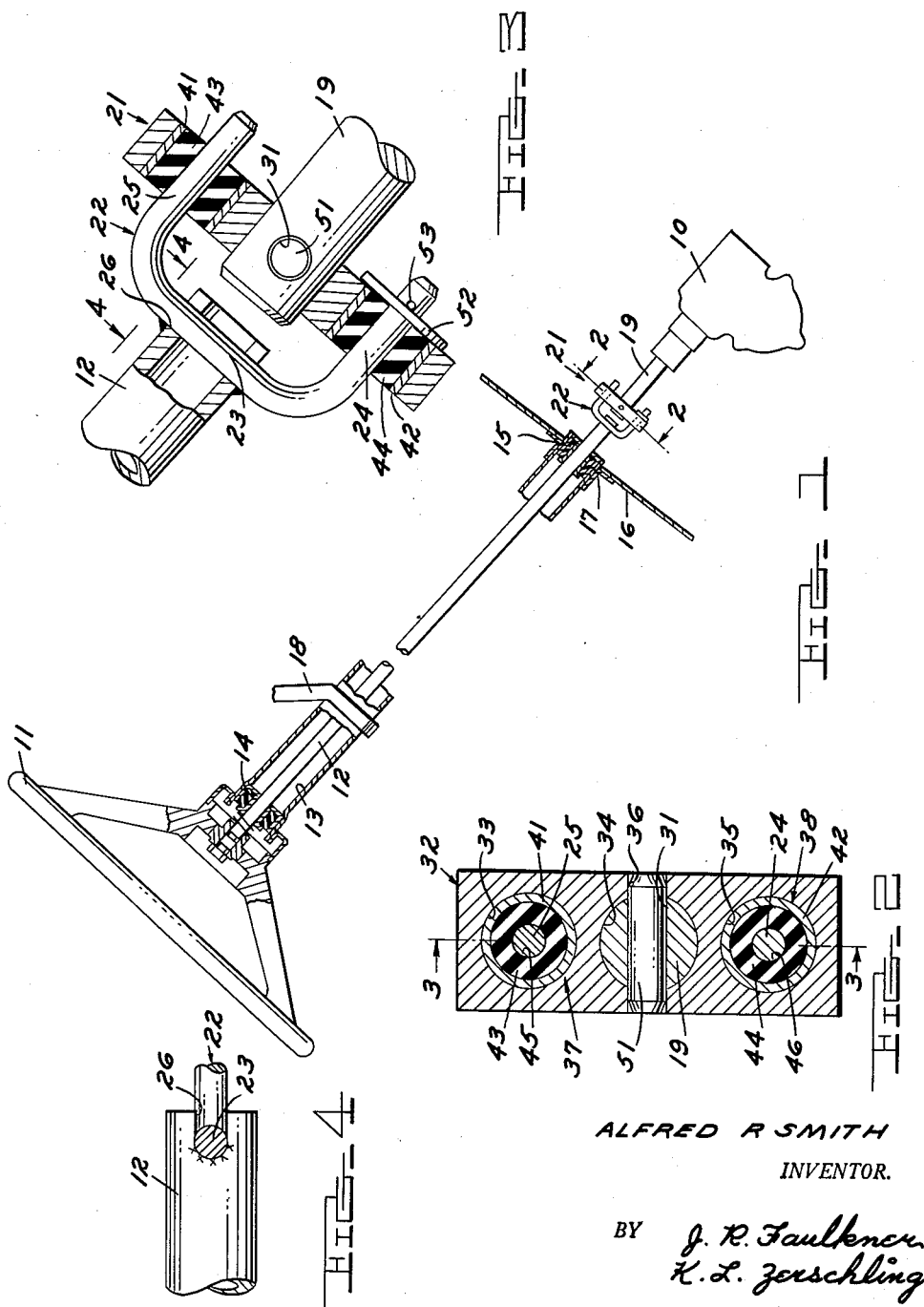
ALFRED R SMITH
INVENTOR.
BY J. R. Faulkner
K. L. Zerschling
ATTORNEYS United States Patent Office 3,044,281
Patented July 17, 1962

3,044,281
STEERING COLUMN COUPLING
Alfred R. Smith, Dearborn, Mich., assignor to Ford Motor Company, Dearborn, Mich., a corporation of Delaware
Filed Mar. 10, 1960, Ser. No. 14,065
1 Claim. (Cl. 64—11)

This invention relates to a steering mechanism for a motor vehicle and more particularly to a steering mechanism which includes a flexible coupling positioned between the steering wheel and the steering gear.

In conventional motor vehicles, a steering gear is connected to the steerable road wheels of the vehicle through a steering linkage which transmits the motion of the steering gear otuput shaft to the steerable wheels. Road shocks and vibrations experienced by the steerable road wheels are transmitted to the steering gear from the steerable wheels through this same steering linkage. Furthermore, the steering gear is conventionally rigidly connected to the chassis of the motor vehicle and consequently other chassis noise and vibration are transmitted to the steering gear from the chassis.

The present invention provides a flexible coupling in the shafting which connects the steering wheel of the motor vehicle to the steering gear. The flexible coupling prevents the transmission of substantially all of the vibrations described above to the steering wheel, thus making the vehicle easier to steer and eliminating a source of driver fatigue. The shaft arrangement for transmitting the torque applied to the steering wheel to the steering gear includes a shaft extending from the steering wheel and a shaft extending from the steering gear. These shafts are aligned and the ends thereof are spaced a short distance from each other. A U-shaped member is affixed to one of the shafts and a plate is affixed to the other shaft. The plate carries a pair of resilient bushings which receive the ends of the U-shaped member. This flexible coupling prevents the transmission of substantially all of the wheel and other chassis noise and vibration to the steering wheel and also compensates for minor misalignments.

An object of the invention is the provision of a steering mechanism in which wheel and other chassis vibrations and noise are prevented from reaching the steering wheel.

Another object of the invention is the provision of an uncomplicated and inexpensive means for isolating wheel and other chassis vibrations and noise from the steering wheel.

Other objects and attendant advantages of the present invention will become readily apparent when the specification is considered in connection with the attached drawings in which:

FIG. 1 is an elevational view partially in section of a portion of a motor vehicle steering mechanism;

FIG. 2 is a sectional view of the flexible coupling of the invention taken along the lines 2—2 in FIG. 1;

FIG. 3 is a sectional view partially in elevation taken along the lines 3—3 in FIG. 2, and FIG. 4 is a view taken along the lines 4—4 in FIG. 3.

Referring now to the drawings in which like reference numerals designate like parts throughout the several views thereof, there is shown in FIG. 1 a portion of a steering mechanism for a motor vehicle. This steering mechanism includes a steering gear 10 affixed to the chassis of a motor vehicle by any suitable means (not shown). It will be understood that the output shaft of the steering gear drives the steerable road wheels of a motor vehicle through a steering linkage (not shown). A steering wheel 11 is affixed to a steering wheel shaft 12 which is rotatably mounted in a steering column tube 13 by means of sleeve bearing assemblies 14 and 15.

The sleeve bearing assemblies may include resilient bushings, as shown, for isolating vibrations between the steering wheel shaft and the steering column tube. The steering column tube 13 is affixed to a floor pan 16 by means of a suitable bracket 17 and to the instrument panel (not shown) by means of a bracket 18. The steering gear 10 includes an input shaft 19 which extends in axial alignment with the steering wheel shaft 12 and is spaced a short distance therefrom in an axial direction.

A flexible coupling, generally designated by the numeral 21, connects the steering wheel shaft 12 with the steering gear input shaft 19. The flexible coupling includes a U-shaped member or rod 22 having a body portion 23 and end portions 24 and 25. The steering wheel shaft 12 may be hollow in configuration as shown in FIG. 2. The end of this shaft includes a diametral slot 26 which receives the body portion 23 of the U-shaped member or rod 22. As can best be seen by reference to FIG. 4, the body portion 23 of the U-shaped member may be welded or otherwise suitably affixed to the steering wheel shaft so that the body portion is securely affixed within the slot 26.

The steering gear input shaft 19 has a diametral bore 31 positioned therein a short distance from the end of the shaft. A plate member, which may be of rectangular configuration, is designated by the numeral 32, and has a plurality of apertures positioned therein, preferably bores 33, 34 and 35 having centers which form a straight line. The plate 32 also includes a transverse bore 36 which intersects the bore 34. The apertures, or bores 33 and 35, have resilient bushings 37 and 38 positioned therein. These bushings include outer metallic sleeves 41 and 42 which have an elastomer such as synthetic rubber bushings 43 and 44 affixed thereto. The bushings 43 and 44 each have a central aperture or bore designated by the numerals 45 and 46.

The steering gear input shaft 19 is received in the central aperture or bore 34 in the plate 32, and is affixed to the plate by means of a cross pin 51 which extends through the transverse bore 36 in the plate 32 and the transverse bore 31 in the steering gear input shaft 19. The end portions 24 and 25 of the U-shaped member or rod 22 extend through the central bores 45 and 46 respectively in the rubber bushings 43 and 44 and engage the rubber bushings in a sliding fit relationship so that relative movement between the U-shaped member and the rubber bushings is permitted in a direction parallel to the axes of the steering whel shaft 12 and the steering gear input shaft 19. Although not illustrated in the drawings, a metal sleeve may be provided between the rubber bushings 43 and 44 and the ends 24 and 25 of U-shaped member 23 to provide a good bearing surface between these members. A washer 52 is positioned over the end 24 of the U-shaped member and is held in place by a pin 53 to prevent accidental disassembly of the unit.

It can readily be appreciated that the torque applied to the steering wheel 11 by the operator of a motor vehicle is transmitted to the steering gear input shaft 19 through the steering wheel shaft 12, the U-shaped member or rod 22 including body portion 23 and end portions 24 and 25, the resilient bushings 37 and 38, the plate 32, and the pin 51. The steering gear output shaft (not shown) then operates upon the steerable road wheels (not shown) of the motor vehicle to perform steering operations.

As described previously, the steering gear 10 is affixed to the chassis of a motor vehicle and hence receives wheel noise and vibration as well as other chassis noise and vibration. The flexible coupling described above prevents the transmission of substantially all of these vibrations and noises to the steering wheel 11 since the bushings 43 and 44 formed of an elastomer will absorb the vibrations of the steering gear 10 and the steering gear input shaft 19. This makes the vehicle easier to steer and eliminates a source of driver fatigue. The flexible coupling also compensates for minor misalignments between and permits relative axial movement between the steering wheel shaft 12 and the steering gear input shaft 19.

The present invention thus provides a steering mechanism for a motor vehicle in which inexpensive and uncomplicated means are employed for preventing wheel and other chassis vibrations from reaching the steering wheel.

It will be understood that the invention is not to be limited to the exact construction shown and described, and that various changes and modifications may be made without departing from the spirit and scope of the invention, as defined in the appended claim.

I claim:

A flexible coupling for connecting a pair of shafts that permits axial movement of the two shafts relative to one another and that substantially prevents vibrations from being transferred from one shaft to the other comprising, a plate member having three aligned bores positioned therein and a bore extending susbtantially perpendicular to a line connecting said three aligned bores and intersecting the central bore, the central of said bores receiving one of said shafts, said one shaft having a diametrically extending bore positioned therein aligned with the bore in said plate that extends substantially perpendicular to a line connecting said three aligned bores and that intersects the central bore, a pin extending through said diametrically extending bore in said one shaft and said bore in said plate that extends substantially perpendicular to the line connecting said three aligned bores and that intersects the central bore, the two remaining bores in said plate member each having a resilient bushing positioned therein, each of said resilient bushings comprising an outer metallic sleeve positioned in engagement with said plate member and having affixed thereto an elastomeric body formed of synthetic rubber, each of said resilient bushings having a central aperture positioned therein, the other of said shafts being positioned in substantial axial alignment with said first mentioned shaft and having one end thereof spaced from one end of said first mentioned shaft, the other of said shafts having a diametral slot positioned in the end thereof adjacent the end of the said first mentioned shaft, a U-shaped member having a body portion and a pair of end portions, said body portion of said U-shaped member being positioned within the diametral slot in the end of said other shaft and being affixed thereto, said end portions extending in a direction substantially parallel to both of said shafts, one end of said U-shaped member being positioned in a sliding fit relationship in the central aperture in one of said resilient bushings, the other end of said U-shaped member being positioned in a sliding fit relationship in the central aperture in the other one of said resilient bushings whereby relative axial movement is permitted between said shafts, and means affixed to one of the legs of said U-shaped member and adapted to engage said plate member for limiting the axial movement of said two shafts in a direction aawy from each other.

References Cited in the file of this patent

UNITED STATES PATENTS

| | | |
|---|---|---|
| 637,515 | Loutzky | Nov. 21, 1899 |
| 1,200,143 | Schrade | Oct. 3, 1916 |
| 1,204,925 | Aldrich | Nov. 14, 1916 |
| 1,572,519 | Davis | Feb. 9, 1926 |
| 1,814,836 | Lederman | July 14, 1931 |
| 2,272,900 | Saurer | Feb. 10, 1942 |
| 2,460,628 | Fawick | Feb. 1, 1949 |
| 2,517,887 | Korn | Aug. 8, 1950 |

FOREIGN PATENTS

| | | |
|---|---|---|
| 606,634 | Germany | Nov. 27, 1931 |